United States Patent [19]

Guitteny et al.

[11] 4,303,682

[45] Dec. 1, 1981

[54] PROCESS OF MAKING MEAT LIKE FOOD PRODUCT

[75] Inventors: Jean L. Guitteny; Jean P. Plaze, both of Jargeau; Michel Roux, Saint Denis de l'Hotel, all of France; Gregory N. Warren, Wodonga, Australia

[73] Assignee: Mars Incorporated, McLean, Va.

[21] Appl. No.: 79,166

[22] Filed: Sep. 26, 1979

Related U.S. Application Data

[63] Continuation of Ser. No. 811,862, Jun. 30, 1977, abandoned.

[30] Foreign Application Priority Data

Jun. 30, 1976 [FR]  France ................................ 76 19900

[51] Int. Cl.$^3$ .......................... A23J 3/00; A23L 1/275
[52] U.S. Cl. .................... 426/250; 426/335; 426/656; 426/657; 426/802; 426/321
[58] Field of Search ............... 426/104, 249, 532, 656, 426/657, 802, 805, 516, 250, 335, 321

[56] References Cited

U.S. PATENT DOCUMENTS

| | | | |
|---|---|---|---|
| 3,765,902 | 10/1973 | Charter | 426/104 X |
| 3,840,677 | 10/1974 | Leidy et al. | 426/104 X |
| 3,851,570 | 12/1974 | Charter | 426/249 X |
| 3,873,736 | 3/1975 | Palmer et al. | 426/249 X |
| 3,886,299 | 5/1975 | Feldbrugge et al. | 426/802 X |
| 3,999,474 | 12/1976 | Sienkiewicz | 426/802 X |
| 4,029,823 | 6/1977 | Bone et al. | 426/249 |
| 4,039,689 | 8/1977 | Bone | 426/805 X |
| 4,061,789 | 12/1977 | Warren | 426/802 X |
| 4,104,415 | 8/1978 | Shanbhag et al. | 426/802 X |

*Primary Examiner*—Robert A. Yoncoskie
*Attorney, Agent, or Firm*—Davis, Hoxie, Faithfull & Hapgood

[57] ABSTRACT

The present invention concerns a process for producing a food product imitating the appearance of marbled meat. The food product according to the invention is obtained by the mixture of at least two compositions of different color, of which a first imitates the color of lean meats or of offals and a second imitates the color of fat, the consistencies preferably also the elasticities of the compositions at the moment of mixing being different from one another. The consistencies preferably differ by from 20 to 700 Brabender units when measured at the same temperature. The use of compositions of different consistencies enables simple mixing or blending techniques and conventional apparatus to be used to obtain the desired random marbling effect. Particularly good results are achieved by incorporating a stiffening or texturizing agent such as wheat gluten. Preferred embodiments of the product comprise protein materials and are stable semi-moist products. The food products according to the invention are more especially intended for domestic animals such as dogs and cats.

14 Claims, No Drawings

PROCESS OF MAKING MEAT LIKE FOOD PRODUCT

This is a continuation application of Ser. No. 811,862 filed June 30, 1977, now abandoned.

The present invention relates to food products imitating the appearance of meat, and more especially proteinaceous food products of the semi-moist type, that is to say having a moisture content between 15 and 50% and preferably between 20 and 35%. The food products according to the invention are particularly suitable for domestic animals such as dogs and cats.

It is known, for example from U.S. Pat. No. 3,380,832 to prepare a solid semi-moist marbled meat pet food in which red and white portions of the product are randomly distributed to imitate the "marbling" of fat in natural meat. To achieve this result, however, the red and white portions, which are prepared by cooking and extrusion, are formed into sheets, and these sheets are superimposed on one another and formed into a loaf-like mass at temperatures between 120° and 170° F. This procedure is troublesome and not well adapted to the needs of economic continuous production.

Subsequent proposals, such as that of Belgian Pat. Nos. 824,213 and 824,218, use specially adapted cooking-extrusion equipment to achieve simultaneous extrusion and random distribution.

One of the present inventors has recently proposed, in copending Application No. 601,601 now U.S. Pat. 4,061,789 issued Dec. 6, 1977, that the red and white compositions should be prepared separately, usually with heating, and should then be brought to different respective temperatures, preferably below 50° C., and at least 5 degrees C. and preferably from 10 to 20 degrees C. different from one another. He has found that this enables a marbled product to be obtained by simply blending the compositions together in conventional mixing or extrusion machinery.

The present inventors have now discovered that a marbled product can be produced by a simple blending operation without the necessity of careful differential temperature control of two or more components, by ensuring that the compositions, by virtue either of their different formulation or of different physical treatment during their preparation, or of both, have different consistencies.

In accordance with this invention therefore a marbled food product is made by a method which comprises: separately preparing at least two plastic food compositions respectively imitating the appearance of lean meat and fat and having different consistencies at the same temperature; bringing the compositions to substantially equal temperatures; and blending the compositions at such temperature together to form a marbled product in which the two portions are different in appearance and texture.

In the preferred embodiments of the method, at least one of the compositions as prepared has a consistency of at least 300 Brabender units and the lean and fat simulating compositions exhibit a difference in consistency at the same temperature of from 20 to 700 Brabender units, and preferably 100 to 350 Brabender units (B.U.). It is convenient for the consistencies of both plastic compositions to lie in the range 300 to 800 B.U.

A secondary factor in the preparation of marbled foods by the present invention is the elasticity of the compositions, and the red and white compositions preferably have a difference in elasticity up to 300 B.U. and preferably between 20 and 200 B.U.

The consistency and elasticity referred to in this application are measured with the apparatus known as the BRABENDER farinograph, used in the manner usual in the cereal industries. This apparatus is available commercially from Brabender OHG-51 Kulturstrasse, 41 Duisburg, Germany.

According to a preferred characteristic of the present invention, the said differences between the consistencies and/or the elasticities of the different compositions persist at least partially into the stage of the finished food product. This observation has not been drawn from numerical results, since at the stage of the finished product the compositions interpenetrate one another intimately in a random manner, which makes impossible any measurement of consistency and elasticity specific to each of the individual plastic compositions.

According to particularly preferred feature of the invention, the food product is constituted by the mixture of two compositions of different colour, of which a first composition having the lowest consistency exhibits the consistency of a soft paste of non-fibrous appearance, while the second composition exhibits a texture of fibrous appearance. Such a food product closely imitates the appearance of a natural meat, the fibrous texture of the composition of pale colour resembling intrusions of fat and/or nervous tissue in the mass of lean meat.

In preparing the preferred food products of this invention a stiffening or texturizing agent is included in at least one of the plastic compositions and in lesser or zero concentration in at least one other of the constituent compositions. Typical concentrations of stiffening agent are from 5 to 35% by weight in the composition of the highest consistency and from 0 to 30% in the composition of the lowest consistency.

It is particularly preferred that an undenatured water-soluble or imbibable protein be employed as stiffening or texturizing agent. An example of such a protein is a protein of visco-elastic properties such as vital wheat gluten which, when included in a composition which is mechanically worked at a temperature below that at which denaturation occurs, develops in situ in the composition the fibrous texture required for the preferred feature mentioned above.

In its preferred embodiments, the food product of the present invention contains at least one nutritive proteinaceous material and at least one nutritive carbohydrate material as well as at least one stiffening or texturizing agent.

Nutritive proteinaceous material contained in the product may be of animal or vegetable origin.

Proteinaceous material of animal origin may be a meaty material or advantageously a mixture of a meaty material and a fatty material. By "meaty material" is to be understood fresh or frozen meats and/or meat by-products of cattle, pigs, horses, goats and other mammals, of poultry and/or of fish; offals such as beef tripes or kidneys; and animal meals such as meat meal, meat and bone meal, fish meal or powdered blood.

As examples of proteinaceous materials of vegetable origin may be mentioned soya meal, soya meal concentrates, soya protein isolates, cottonseed meal, groundnut meal, maize germ meal and wheat germ meal.

Among other nutritive proteinaceous materials that can be included in the composition of food products according to the invention may be mentioned, for example, microbial protein meals, yeast and milk proteins.

By "fatty material" is to be understood fats and oils of vegetable or animal origin, whether raw or subjected to an industrial treatment such as hydrogenation. Examples include sunflower oil, soya oil, groundnut oil and edible suet.

The nutritive proteinaceous material preferably constitutes 5 to 60% by weight of the food product according to the invention, and preferably comprises between 20 and 50% by weight.

The fatty material which may optionally be included may constitute 0 to 15% by weight of the food product according to the invention and preferably comprises between 2 and 10% by weight.

By "nutritive carbohydrate material" is to be understood principally starchy materials and sugars. As examples of starchy materials may be mentioned grains, tubers and/or cereal flours such as those of maize, wheat, oats, millet, barley or rice, as well as starch, whether modified or not. As examples of sugars may be mentioned monosaccharides such as the pentoses (L-arabinose, D-ribose, D-xylose), hexoses (D-glucose, D-fructose, D-galactose, D-mannose), heptoses (D-sedoheptulose); oligosaccharides such as disaccharides (sucrose, maltose, lactose) and trisaccharides (raffinose); and polysaccharides of vegetable origin such as starch and its derivatives and cellulose. Sugars may be employed as solutes for the purpose of reducing the water activity ($A_w$) of semi-moist products to ensure microbiological stability.

Other carbohydrate materials, such as gum arabic, agar-agar, pectins, carraghenates and alginates can equally be included in the composition of the food products of this invention.

Among possible stiffening or texturizing agents may be distinguished proteinaceous and carbohydrate stiffening agents. Proteinaceous agents are primarily water-soluble or imbibable proteins, for example, wheat gluten, casein, caseinates of alkali and alkaline earth metals, especially the sodium and potassium derivatives, ammonium caseinate and soya isolates. Carbohydrate agents include, for example, starches, pregelatinized starch and wheat flour. Thickening or gelling agents such as carraghenates, alginates and pectins can similarly be used as stiffening agents. Of particular value are functional or undenatured proteins, for example vital gluten, which respond to mechanical working with a change in texture and/or appearance.

Semi-moist food products according to the invention advantageously contain humectant agents. As examples of humectant agents may be cited propylene glycol, glycerol, mannitol, 1,3-butanediol and other polyalcohols. Specific humectant agents can be present in the food products according to the invention at a level of, for example, 2 to 10% by weight. Sugars also have some humectant action in the product.

The food products according to the invention can likewise advantageously contain preservative agents, such as antimycotic and antibacterial agents, among which may be mentioned potassium sorbate, sorbic acid, calcium propionate, various organic acids and their derivatives.

The food products according to the invention may also contain antioxidant agents, for example propyl gallate, intended to avoid or reduce the rancidity of fats. Butylhydroxyanisole and butylhydroxytoluene can also be used as antioxidant.

The food products according to the invention may also advantageously contain mineral salts such as sodium chloride. Moreover they can likewise contain vitamins such as vitamins A, B1, B2, B6, B12, D and E, choline chloride, folic acid and niacin.

Our experiments have shown that the proportions of the various ingredients incorporated in the composition of food products according to the invention are preferably within the ranges given in Table I hereinafter. The same Table indicates also the preferred contents of the two compositions R and B, which respectively designate the composition imitating the colour of lean meat or offal and the composition imitating the colour of fat.

In the following description the colour resembling that of lean meat or offals is designated as the red colour and the colour resembling that of fat as the white colour. It should however be understood that the present invention extends equally to compositions imitating the colour of offals which exhibit a colour verging on brown, for example in order to imitate liver. Furthermore, if it is desired to prepare a food product of which one of the compositions imitates poultry meat, then the composition should be chosen as a pale colour.

On the other hand, the composition of a colour imitating fat is substantially white, but it may tend towards yellow, for example to imitate certain fats, such as duck fat.

The red composition may thus contain a non-toxic red colorant such as erythrosine, cochineal red or Chocolate Brown, while the white composition may contain a colorant conferring its pale colour. For this purpose titanium dioxide, for example, may be used.

TABLE I

| INGREDIENTS | Composition R % by weight | | Composition B % by weight | |
|---|---|---|---|---|
| | Concentration | Preferred Concentration | Concentration | Preferred Concentration |
| Proteinaceous materials | 5-60 | 20-55 | 5-60 | 6-37 |
| Fatty materials | 0-15 | 2-10 | 0-15 | 2-10 |
| Carbohydrate materials | 0-60 | 10-40 | 0-80 | 10-55 |
| Stiffening agent | 0-30 | 0-10 | 5-35 | 7-25 |
| Humectants | 2-10 | approx. 5 | 2-10 | approx. 5 |
| Preservative Antimycotic Antibacterial agent Antioxidant Colouring matter | in quantity sufficient to obtain the stability and colour of the product. | | | |
| Moisture content % | 15-50 | 20-35 | 10-45 | 12-30 |
| Consistency* | 300-800 | 400-600 | 350-1000 | 600-800 |

TABLE I-continued

| INGREDIENTS | Composition R % by weight | | Composition B % by weight | |
|---|---|---|---|---|
| | Concentration | Preferred Concentration | Concentration | Preferred Concentration |
| Elasticity* | 40–300 | 100–200 | 80–300 | 200–300 |

*expressed in Brabender units (B.U.), measured at 40° C. and atmospheric pressure.

In Table II are given six specific examples of compositions according to the invention. The compositions 1, 2 and 4 to 6 could be used with equal success as a red composition or as a white composition. In contrast, composition 3 is preferably only used as the composition with the lowest consistency. Other formulations appear in the examples in Table III hereinafter.

In general, it is preferred to use as the red composition the composition of lowest consistency and/or elasticity and as the white composition the composition of highest consistency and/or elasticity. It should however be understood that food products in which the red composition has a consistency and/or elasticity greater than that of the white composition are equally within the scope of the present invention.

TABLE II

| Examples of compositions n° | 1 | 2 | 3 | 4 | 5 | 6 |
|---|---|---|---|---|---|---|
| Meats and offals | 27 | 27 | 27 | 27 | 27 | 27 |
| Fats (suet and oil) | 7 | 7 | 7 | 7 | 7 | 7 |
| Propylene glycol | 5 | 5 | 5 | 5 | 5 | 5 |
| Emulsifier and stabilizer | 0.6 | 0.6 | 0.6 | 0.6 | 0.6 | 0.6 |
| Sodium chloride | 2.4 | 2.4 | 2.4 | 2.4 | 2.4 | 2.4 |
| Sugars | 24 | 24 | 24 | 24 | 24 | 24 |
| Maize starch | 7 | 4 | 8 | 7 | 7 | 7 |
| Defatted soya meal | 22 | — | 26 | 12 | 18 | 19 |
| Vital wheat gluten | 5 | 30 | — | — | — | — |
| Casein | — | — | — | — | 9 | — |
| Soya isolate | — | — | — | — | — | 8 |
| Pregelatinized starch | — | — | — | 15 | — | — |
| Consistency* | 560 | 760 | 300 | 390 | 350 | 410 |
| Elasticity* | 130 | 240 | 40 | 100 | 100 | 100 |

*expressed in Brabender units (B.U.), measured at 40° C. and atmospheric pressure.

In general, the composition imitating the colour of fat is present in the food products according to the invention at a level of 5 to 20% by weight. However, in the case where a food product is desired of which the white composition imitates poultry meat, such as chicken or turkey meat, it is perfectly possible to use more than 20% by weight of the white composition. In such a case the white composition can represent up to 95% by weight of the food product.

Turning now in greater detail to the process of preparing the marbled food products previously described, the difference in consistency and preferably also of elasticity between the compositions of different colour intended to be mixed together may be obtained by carrying out at least one of the following operations:

(a) a "red" composition and a "white" composition are used containing a stiffening or texturizing agent at different concentrations. This difference in percentage of the texturizing agent should, in order to create a difference of consistency and/or elasticity, be of the order of 5 to 25% and preferably about 10 to 15%;

(b) at least one of the compositions being one containing a stiffening or texturizing agent is subjected to a mechanical working or kneading operation. This operation conducted at a temperature between 20° and 80° C., preferably about 60° C., tends to increase the consistency and/or the elasticity of the composition thus treated. In the particular case where vital gluten is employed as texturizing agent, this kneading operation is in fact responsible for the development of a texture of fibrous appearance as previsously described.

In the case where only one of the said compositions is subjected to such a kneading operation, the other composition may be subjected to a thermal treatment at a higher temperature between 80° and 170° C., preferably about 150° C. This thermal treatment should be carried out for a time sufficient to ensure pasteurization of the said composition thus treated. This other composition may contain a functional, undenatured protein texturizing agent, but even at the same concentration as in the first composition it will not with this processing develop a stiff fibrous texture owing to the high temperature employed;

(c) the moisture content of each of the two compositions of different colour is controlled in such a manner that the moisture content of the composition of highest consistency and/or elasticity is lower than the moisture content of the other composition. Our experiments have shown that, to obtain a food product of most satisfactory appearance, the moisture content of the composition of lowest consistency and/or elasticity should preferably be between 20 and 50%, while the moisture content of the other composition should preferably be between 12 and 30%. The results of these experiments are included in Table I where the composition R was the composition of lowest consistency and/or elasticity.

In order to obtain this difference in consistency and preferably also of elasticity one may carry out not only one of the three operations a, b and c indicated above, but any of the possible combinations. Thus combination of the operations a and b gives perfectly satisfactory results.

The invention will be further described by way of example by reference to preferred formulations and techniques of preparation without, however, any intention that the invention shall be limited thereto.

In Table III hereinafter are given specific examples of food products imitating the appearance of marbled meat according to the invention. Besides the values of consistency and elasticity, this table also shows the temperature at which the mixing of the two compositions R and B was carried out.

TABLE III

| | Example 1 | | Example 2 | | Example 3 | |
|---|---|---|---|---|---|---|
| INGREDIENTS | Composition R | Composition B | Composition R | Composition B | Composition R | Composition B |
| Meats and offals | 27 | 27 | 27 | 27 | 27 | 27 |
| Fats and oils | 6 | 6 | 6 | 6 | 7 | 7 |

TABLE III-continued

| INGREDIENTS | Example 1 Composition R | Example 1 Composition B | Example 2 Composition R | Example 2 Composition B | Example 3 Composition R | Example 3 Composition B |
|---|---|---|---|---|---|---|
| Sugars | 23 | 18 | 25 | 25 | 24 | 24 |
| Defatted soya meal | 24 | — | 12 | 8 | 22 | 16 |
| Starchy materials | 7 | 6.0 | 7 | 7 | 7 | 8 |
| Vital gluten | — | 30 | 10 | 14 | 5 | 10 |
| Humectant | 5.5 | 5.5 | 5.5 | 5.5 | 5 | 5 |
| Vitamin mixture | 2 | 2 | 2 | 2 | — | — |
| Preservatives | 1 | 1 | 1 | 1 | 0.6 | 0.6 |
| Mineral supplement | 4.5 | 4.5 | 4.5 | 4.5 | 2.4 | 2.4 |
| Red colour | Q.S. | 0 | Q.S. | 0 | Q.S. | 0 |
| White colour | 0 | Q.S. | 0 | Q.S. | 0 | Q.S. |
| Consistency* | 300 | 760 | 580 | 740 | 560 | 580 |
| Elasticity* | 40 | 240 | 220 | 240 | 130 | 220 |
| Mixing temperature | 40° C. | 40° C. | 40° C. | 40° C. | 40° C. | 40° C. |

*expressed in Brabender Units (B.U.)

The process of preparation which is the subject of the present invention will be further described by means of a particular example of its practice.

A moist mixture of animal and/or vegetable proteinaceous materials, a first dry, powdered mixture having a colour corresponding to that of lean meat or offal and a second dry powdered mixture having a colour corresponding to that of fat or nervous infiltrations are separately prepared.

The moist mixture may contain, for example, belly of beef, beef kidneys, a preservative mixture comprising potassium sorbate, edible suet, sunflower oil and propylene glycol.

Each of the two dry mixtures contain, in the same proportions, maize starch, soya meal, dextrose, sucrose, vitamins A, B, D and E, and salt. The white mixture also contains 0.1% by weight titanium dioxide and about 20% by weight vital gluten. The red mixture also contains 0.1% erythrosine and about 5% by weight vital gluten.

The portion of the moist mixture intended to be added to the red mixture is directly mixed with the latter, the red composition thus obtained being introduced into a cooker-extruder where it is subjected, for example, to a "flash pasteurization" operation at a temperature between 80° and 170° C., preferably at 150° C., for a short time of, say, 10 to 60 seconds and preferably for about 30 seconds. This thermal treatment, carried out here in the cooker-extruder but quite capable of being carried out in other equipment and either upstream or downstream of the extruder, is intended to produce the portion of the food product which exhibits the lowest consistency and/or elasticity and, in this example, the consistency of a soft paste of non-fibrous appearance. This soft paste without fibrous texture then leaves the cooker-extruder and is advanced by any convenient means towards the location where it is to be mixed with the second portion of the food product. During this transport operation the said soft paste undergoes cooling, for example to a temperature of 40° C.

Simultaneously with the operation described above, the white powdered mixture containing the texturizing agent at the highest percentage is mixed with the other portion of the moist mixture of proteinaceous raw or starting materials, the latter having advantageously been subjected to pasteurization at a temperature near to 100° C., for example for a duration of 10 minutes. It should be noted, however, that where the undenatured functional properties of a protein component are to be relied upon for the development of a desirable texture in the product, as in the case of the vital gluten referred to in this example, the protein concerned should be protected from excessive heat treatment. It is for this reason that it is provided in the coloured mixtures, which are not added until after the raw proteinaceous materials of the moisture mixture have been pasteurized.

The powdered white mixture, initially at ambient temperature, is mixed with the moist mixture after pasteurization, which results in a white composition attaining a temperature of about 80° C. This white composition is then subjected to a kneading operation conducted at a temperature between 20° and 80° C. and preferably at 60° C. If this operation is carried out in a discontinuous manner, it may, for example, be conducted in a mixer for a time of the order of 5 minutes. However, this kneading operation, intended here to develop a fibrous texture, could equally be carried out in a continuous process by conventional machinery.

The kneading operation completed, the white composition exhibiting a texture of fibrous appearance is cooled, for example, by conventional means to a temperature of 40° C. and then advanced to a place where it can be added to the soft paste of non-fibrous texture and red colour. The two compositions, red and white, are then combined in such a manner that they interpenetrate one another in a random manner in order to simulate the appearance of intrusions of fat in the interior of lean meat. This mixing operation can be carried out in a variety of known apparatus, for example a simple extruder such as a mincing machine the outlet of which is fitted with a die-plate. The mincer is thus fed simultaneously with the red composition and the white composition at the same temperature of about 40° C. Finally, there is applied to the food product thus obtained a conventional mechanical treatment, such as cutting into pieces, to provide the final product in a desired form.

In the particular example described above, the red composition was introduced into a cooker-extruder and subjected to a "flash pasteurization" operation in order to produce a soft paste without fibrous texture. It will be apparent that where the powdered mixture of red colour does not contain a texturizing agent, it is perfectly possible to submit the resulting red composition to a kneading operation (as described for the white composition), since the absence of a texturizing agent avoids the risk of engendering the development of a texture of fibrous appearance. In a similar case, where either of the two dry powdered mixtures does not contain a texturizing agent, the latter may be replaced by another proteinaceous material of nutritional value in order to make a sufficient protein contribution to the final product.

The product thus obtained is stable at ambient temperature, has an excellent storage life and has good acceptance and palatability characteristics for domestic animals.

This procedure can be used with any of the three Examples given in Table III, or indeed with any of the formulations given in Table II provided always that the formulations are chosen with a view to achieving the difference in consistency and colour required for this invention.

In these particular examples use has been made of moist mixtures of animal or vegetable proteinaceous materials on a basis of natural meats. It is estimated that the latter contain about 30% protein components and fats and about 70% water. It is evident that, if it is desired to obtain a semi-moist food product and if dry animal meals are employed, the corresponding quantity of water will have to be added to give a final product having a moisture content between 15 and 50%. In this regard, the use of a dry powder of proteinaceous materials has some advantages as compared with a moist mixture; for example, it facilitates the mixing operations.

We claim:

1. A process for the preparation of a food product of moisture content between 15% and 50% by weight simulating marbled meat and including portions immitating the appearances of lean meat and fat, which method comprises: separately preparing at least two plastic proteinaceous food compositions respectively immitating in color the appearances of lean meat and fat, at least one of said compositions as prepared having a consistency of at least 300 Brabender units and the lean and fat simulating compositions exhibiting a difference in consistency at the same temperature of from 20–700 Brabender units; and blending together the compositions at substantially equal temperatures to intermingle said compositions at least sufficiency to form a marbled product in which the two portions are randomly distributed.

2. A process according to claim 1 wherein at least one of the compositions as prepared has a consistency of at least 300 Brabender units and the lean and fat simulating compositions exhibit a difference in consistency at the same temperature of from 20 to 700 Brabender units.

3. A process according to claim 1 wherein the difference in consistency between the lean and fat simulating compositions at the same temperature is from 100 to 350 Brabender units.

4. A process according to claim 1 wherein the consistencies of both plastic compositions lie within the range 300 to 800 Brabender units.

5. A process according to claim 1 wherein a stiffening or texturizing agent is incorporated in at least one of the plastic compositions and in lesser or zero concentration in at least one other composition.

6. A process according to claim 1 wherein the plastic composition of the highest consistency contains 5 to 35% by weight vital gluten, constituting said agent, and the composition of the lowest consistency contains 0 and 30% by weight vital gluten, the difference in stiffening agent content of the two compositions being from 5 to 25%; the composition of the highest consistency is mechanically worked at a temperature between 20° and 80° C. to develop a texture of fibrous appearance; and the composition of the lowest consistency is heat treated at a temperature between 80° and 170° C., whereby a difference in consistency is established between the said compositions.

7. A process according to claim 6 wherein the compositions having temperatures within 5° C. of each other are forced together through an apertured die or extrusion head to form the marbled product.

8. A process according to claim 6 wherein the moisture content of the plastic composition with the highest consistency is lower than that of the composition with the lowest consistency.

9. A process according to claim 8 wherein the plastic composition with the highest consistency has a moisture content of 12–30% and the composition with the lowest consistency has a moisture content of 20–50%.

10. A process according to claim 1 wherein the compositions contain humectant and antimycotic in amounts to confer stability to the product.

11. A process according to claim 1 wherein the plastic compositions together contain nutritive proteinaceous material in an amount of about 5 to 60% by weight of the food product.

12. A process according to claim 11 wherein the plastic compositions together contain fatty material in an amount up to 15% by weight of the product and supplemental amounts of nutritive carbohydrates.

13. A process for the preparation of a proteinaceous food product of moisture content between 15% and 50% simulating marbled meat and including portions respectively resembling lean meat and fat in appearance, said method comprising the steps of:

separately preparing at least two plastic food compositions respectively resembling lean meat and fat in appearance, at least one of said compositions comprising edible protein, and wherein a stiffening or texturizing agent is included in at least one of the plastic compositions and in lesser or zero amount in at least one other of the compositions such that a difference in consistency can be developed between said compositions by working;

mechanically working the composition containing said greater quantity of texturizing or stiffening agent and thereby developing a difference in consistency at the same temperature of from 20–700 Brabender units between said mechanically worked composition and said other composition;

and blending together said compositions of different consistencies and appearance to intermingle said compositions at least sufficiently to form a marbled product in which said portions are randomly distributed.

14. The process of claim 1 wherein one of the compositions is colored red and another composition is colored substantially white and the compositions are blended together in such a manner that they interpenetrate one another in a random manner in order to simulate the appearance of intrusions of fat in the interior of lean meat.

* * * * *